United States Patent
Ueki et al.

(10) Patent No.: US 10,631,391 B2
(45) Date of Patent: Apr. 21, 2020

(54) X-RAY GENERATION DEVICE, X-RAY FLUOROSCOPIC IMAGE PHOTOGRAPHING DEVICE AND CT IMAGE PHOTOGRAPHING DEVICE

(71) Applicant: SHIMADZU CORPORATION, Kyoto-Shi, Kyoto (JP)

(72) Inventors: Futoshi Ueki, Kyoto (JP); Bunta Matsuhana, Kyoto (JP)

(73) Assignee: SHIMADZU CORPORATION, Kyoto-Shi (JP)

(*) Notice: Subject to any disclaimer, the term of this patent is extended or adjusted under 35 U.S.C. 154(b) by 0 days.

(21) Appl. No.: 16/120,320

(22) Filed: Sep. 3, 2018

(65) Prior Publication Data
US 2019/0082524 A1  Mar. 14, 2019

(30) Foreign Application Priority Data
Sep. 11, 2017 (JP) ................................ 2017-173768

(51) Int. Cl.
*H05G 1/06* (2006.01)
*H05G 1/10* (2006.01)
(Continued)

(52) U.S. Cl.
CPC ............. *H05G 1/10* (2013.01); *G01N 23/043* (2013.01); *G01N 23/046* (2013.01); *H01J 35/08* (2013.01);
(Continued)

(58) Field of Classification Search
CPC ........ H05G 1/10; H05G 1/025; G01N 23/043; G01N 23/046
See application file for complete search history.

(56) References Cited

U.S. PATENT DOCUMENTS

| 5,134,641 A | * | 7/1992 | Friede | H01J 3/025 |
| | | | | 313/231.31 |
| 5,878,109 A | * | 3/1999 | Negle | H05G 1/06 |
| | | | | 378/109 |

(Continued)

FOREIGN PATENT DOCUMENTS

| GB | 1147805 | 4/1969 |
| JP | 2009176462 | 8/2009 |

OTHER PUBLICATIONS

"Search Report of Europe Counterpart Application", dated May 15, 2019, p. 1-p. 12.
(Continued)

*Primary Examiner* — Kiho Kim
(74) *Attorney, Agent, or Firm* — JCIPRNET (57) ABSTRACT

Provides is an X-ray generation device, an X-ray fluoroscopic image photographing device and a CT image photographing device; the X-ray generation device is capable of facilitating the electrical connection of terminals of an X-ray tube to terminals of a high voltage generation part, capable of preventing wiring bodies which connect these terminals from contacting with each other, and capable of preventing the wiring bodies from separating from the terminals of the X-ray tube or the terminals of the high voltage generation part. A wiring body includes a conductive bar-shaped member having stiffness and contact sockets arranged at two ends of the bar-shaped member. The sockets are fixed to the bar-shaped member using riveting parts. Each socket is electrically connected to a terminal of the high voltage generation part and a terminal of the X-ray tube which function as contact plugs.

12 Claims, 10 Drawing Sheets

(51) Int. Cl.
  *H01J 35/14*    (2006.01)
  *H05G 1/08*     (2006.01)
  *H01J 35/08*    (2006.01)
  *G01N 23/04*    (2018.01)
  *G01N 23/046*   (2018.01)
  *H05G 1/02*     (2006.01)

(52) U.S. Cl.
  CPC ............ *H01J 35/14* (2013.01); *H05G 1/025* (2013.01); *H05G 1/06* (2013.01); *H05G 1/08* (2013.01)

(56) References Cited

U.S. PATENT DOCUMENTS

| | | | |
|---|---|---|---|
| 2002/0018544 A1 | 2/2002 | Chabin et al. | |
| 2006/0098778 A1* | 5/2006 | Oettinger | H05G 1/06 378/101 |
| 2009/0268873 A1* | 10/2009 | Inazuru | H01J 35/025 378/140 |
| 2013/0235978 A1* | 9/2013 | Allen | H01J 35/101 378/133 |
| 2014/0140486 A1 | 5/2014 | Yanagisawa et al. | |
| 2015/0150466 A1* | 6/2015 | Abi-Jaoudeh | A61B 5/015 600/424 |

OTHER PUBLICATIONS

"The Partial Search Report of Europe Counterpart Application", dated Jan. 25, 2019, p. 1-p. 13.

\* cited by examiner

X-RAY GENERATION DEVICE, X-RAY FLUOROSCOPIC IMAGE PHOTOGRAPHING DEVICE AND CT IMAGE PHOTOGRAPHING DEVICE

CROSS-REFERENCE TO RELATED APPLICATION

This application claims the priority benefit of Japan application serial no. 2017-173768, filed on Sep. 11, 2017. The entirety of the above-mentioned patent application is hereby incorporated by reference herein and made a part of this specification.

BACKGROUND

1. Field of the Disclosure

The present disclosure relates to an X-ray generation device provided with an X-ray tube and a high voltage generation part applying a high voltage to the X-ray tube, and an X-ray fluoroscopic image photographing device and a CT (Computed Tomography) image photographing device using the X-ray generation device.

2. Description of Related Art

As such an X-ray generation device, an existing structure provided with a mono-tank high voltage tank which accommodates a high voltage generation part and an X-ray tube in the same insulating oil tank is known (see patent literature 1).

Figure 10:
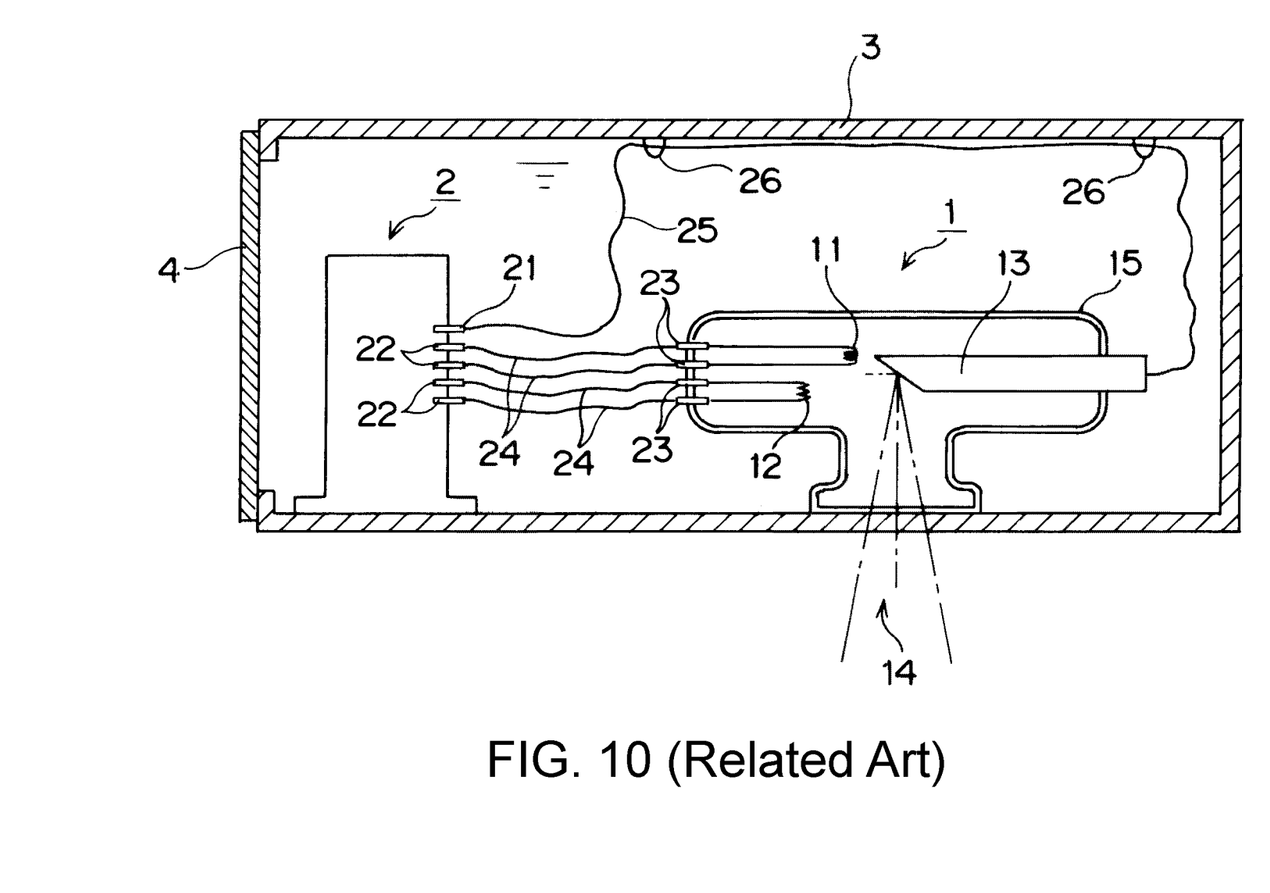
FIG. 10 is a schematic diagram of an existing X-ray generation device.

FIG. 10 is a schematic diagram of such an existing X-ray generation device.

The X-ray generation device has a structure that an X-ray tube 1 and a high voltage generation part 2 are accommodated in a chamber formed by a housing 3 and a lid body 4. Insulating oil is filled in the chamber formed by the housing 3 and the lid body 4.

The X-ray tube 1 includes a glass tube 15 and a plurality of terminals 23 arranged across the interior and exterior of the glass tube 15. Besides, a filament 11, a heater 12, and a target 13 are arranged inside the glass tube 15. Here, the filament 11 is used to emit an electron beam toward the target 13. The electron beam emitted from the filament 11 collides with the target 13 to generate X-ray. The X-ray is irradiated toward the outside of the X-ray tube 1 from an X-ray irradiating part 14. In addition, the heater 12 is also called as a getter, and is used to adsorb gas molecules inside the glass tube 15.

The target 13 is connected to a terminal 21 in the high voltage generation part 2 via a flexible cable 25 which is a single-core wire, and is applied with a positive high voltage accelerating electron beam from the high voltage generation part 2. The flexible cable 25 is supported by a support member 26 arranged on a ceiling part of the housing 3.

Besides, the terminals 23 in the X-ray tube 1 connected with the filament 11 and the heater 12 are connected to terminals 22 in the high voltage generation part 2 via flexible cables 24 which are single-core wires. A filament current is applied to the filament 11 from the high voltage generation part 2 via the terminals 22, the flexible cables 24 and the terminals 23. Besides, a heater current is applied to the heater 12 from the high voltage generation part 2 via the terminals 22, the flexible cables 24 and the terminals 23.

Moreover, the flexible cables 24 and each terminal 22, 23 are usually connected by a solder. In view of the necessity to set a distance between the terminals 22 and the terminals 23 to a degree at which discharge is avoided, the length of the flexible cables 24 shall be above a specific length.

[Patent literature 1] Japanese Laid-open No. 2009-176462

In such an existing X-ray generation device, in order to prevent the multiple flexible cables 24 connecting the terminals 23 in the X-ray tube 1 to the terminals 22 in the high voltage generation part from contacting with each other, it is necessary to use individual holding members and so on to fix the plurality of flexible cables 24 at positions spaced apart from each other.

Besides, when the structure is employed in which the flexible cables 24 and each terminal 22, 23 are connected by a solder, it is necessary to perform soldering to multiple terminals 22, 23 which are close to each other, and the operation is extremely complicated. In addition, when the solder becomes a bump, a problem that the bump becomes a starting point of discharge occurs.

Therefore, a solution of connecting the flexible cables 24 and each terminal 22, 23 with a connector is considered. When an X-ray generation device is used at this moment, because the X-ray generation device is used in various postures, it is necessary to employ a locking structure so that the flexible cables 24 and each terminal 22, 23 do not separate. However, when such a locking structure is employed, a problem occurs that when insulating oil is filled and defoaming of dissolved air is performed, bubbles remain in the connector part.

Furthermore, a solution of connecting the flexible cables 24 and each terminal 22, 23 by riveting is also considered. However, in the case that the flexible cables 24 and each terminal 22, 23 are directly connected by riveting, the flexible cable 24 and each terminal 22, 23 cannot be detached. Usually, the X-ray tube 1 is a consumable in the X-ray generation device, thus it is necessary to replace the X-ray tube after a specific time; therefore, when the flexible cables 24 and each terminal 22, 23 cannot be detached, the replacement of the X-ray tube 1 is obstructed.

SUMMARY

An embodiment of the disclosure provides an X-ray generation device, which includes: an X-ray tube; a high voltage generation part, which applies a high voltage to the X-ray tube; and a wiring body, which connects terminals in the X-ray tube to terminals in the high voltage generation part; the wiring body is formed by a conductive bar-shaped member having stiffness, which includes a connecting part that is connected to the terminals in the X-ray tube at one end, and includes a connecting part that is connected to the terminals in the high voltage generation part at the other end.

An embodiment of the disclosure provides an X-ray fluoroscopic image photographing device which uses the X-ray generation device.

An embodiment of the disclosure provides a CT image photographing device which uses the X-ray generation device.

BRIEF DESCRIPTION OF THE DRAWINGS

FIG. 8 is an enlarged diagram illustrating a wiring body 73 of the fourth embodiment along with the terminals 22, 23 and so on.

FIG. 9 is an enlarged diagram illustrating the wiring body 70 along with the terminals 22, 23 and so on.

DESCRIPTION OF THE EMBODIMENTS

One of the embodiments of the present disclosure is accomplished to solve the abovementioned problems, and aims to provide an X-ray generation device, an X-ray fluoroscopic image photographing device and a CT image photographing device; the X-ray generation device is capable of facilitating the electrical connection of terminals of an X-ray tube to terminals of a high voltage generation part, capable of preventing wiring bodies which connect these terminals from contacting with each other, and capable of preventing the wiring bodies from separating from the terminals of the X-ray tube or the terminals of the high voltage generation part.

According to an embodiment of the disclosure, a metallic bar-shaped member is used as the conductive bar-shaped member.

According to an embodiment of the disclosure, a contact socket is arranged at an end of the bar-shaped member.

According to an embodiment of the disclosure, a contact socket is arranged at an end of the bar-shaped member, and a contact plug is arranged on the terminal in the X-ray tube or the terminal in the high voltage generation part.

According to an embodiment of the disclosure, a contact plug is arranged at an end of the bar-shaped member, and a contact socket is arranged on the terminal in the X-ray tube or the terminal in the high voltage generation part.

According to an embodiment of the disclosure, the bar-shaped member is a tubular member capable of being connected to the terminal in the X-ray tube and the terminal in the high voltage generation part.

According to an embodiment of the disclosure, the terminals in the X-ray tube and the terminals in the high voltage generation part are accommodated in a chamber, and an interior of the chamber is filled with insulating oil.

According to an embodiment of the disclosure, the terminals in the X-ray tube and the terminals in the high voltage generation part are accommodated in a chamber, and an interior of the chamber is filled with an insulating gas.

According to an embodiment of the disclosure, the terminals in the X-ray tube and the terminals in the high voltage generation part are accommodated in a chamber, and an interior of the chamber is set to a high-vacuum state.

According to an embodiment of the disclosure, the X-ray tube includes terminals arranged in the chamber and a target protruding outside from the chamber, the target is connected to ground, the high voltage generation part has a lid body structure closing the chamber, and the terminals in the high voltage generation part supply a minus voltage to the terminals in the X-ray tube.

According to the embodiments of the disclosure, the electrical connection of the terminals of the X-ray tube and the terminals of the high voltage generation part can be easily performed, and the wiring body connecting these terminals can be prevented from contacting with each other. Moreover, even if special locking mechanism is not used, the wiring body can be prevented from separating from the terminals of the X-ray tube or the terminal s of the high voltage generation part.

According to an embodiment of the disclosure, by the high voltage generation part doubling as a lid body, the device structure can be simplified, and wirings for applying a target voltage to the X-ray tube can be removed.

Figure 1:
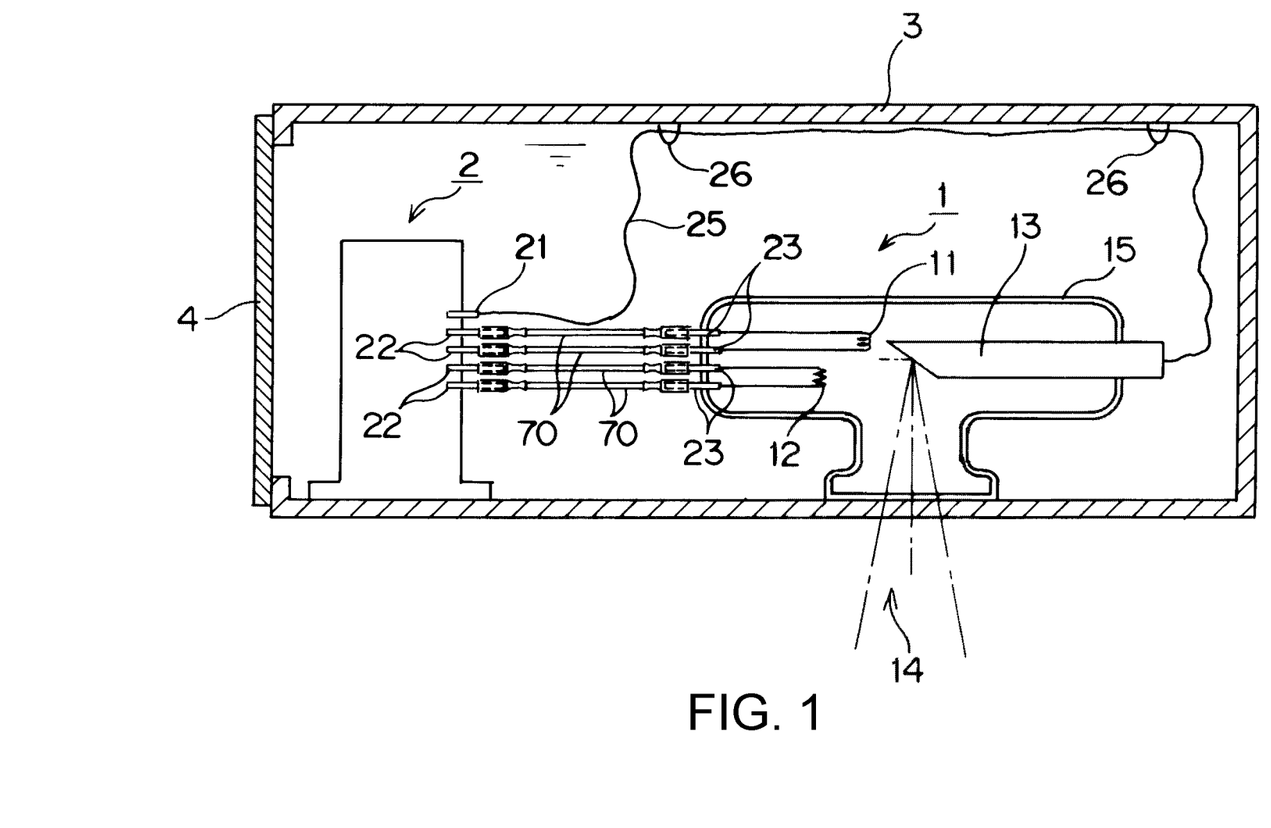
FIG. 1 is a schematic diagram of an X-ray generation device according to a first embodiment of the present disclosure.

In the following part, an embodiment of the present disclosure is described based on the drawings. FIG. 1 is a schematic diagram of an X-ray generation device according to a first embodiment of the present disclosure.

The X-ray generation device of the present disclosure has a structure which accommodates an X-ray tube 1 and a high voltage generation part 2 in a chamber formed by a housing 3 and a lid body 4. The interior of the chamber formed by the housing 3 and the lid body 4 is filled with insulating oil. Accordingly, the interior of the chamber formed by the housing 3 and the lid body 4 and the high voltage generation part 2 can be set an insulating state. Moreover, the interior of the chamber may also be set to the insulating state by filling the interior of the chamber with an insulating gas or setting the interior of the chamber to a high-vacuum state instead of using insulating oil.

The X-ray tube 1 includes a glass tube 15 and a plurality of terminal 23 arranged across the interior and exterior of the glass tube 15. Besides, a filament 11, a heater 12, and a target 13 are arranged inside the glass tube 15. Here, the filament 11 is used to emit an electron beam toward the target 13. The electron beam emitted from the filament 11 generates an X-ray by colliding with the target 13. The X-ray is irradiated from an X-ray irradiating part 14 toward the exterior of the X-ray tube 1. Besides, the heater 12 is also called as a getter, and is used to adsorb gas molecules inside the glass tube 15.

The target 13 is connected to terminals 21 in the high voltage generation part 2 via flexible cables 25 which are single-core wires, and is applied with a positive high voltage for accelerating the electron beam from the high voltage generation part 2. The flexible cables 25 are supported by a support member 26 arranged on a ceiling part of the housing 3.

On the other hand, the terminals 23 in the X-ray tube 1 which are connected to the filament 11 and the heater 12 are connected to the terminals 22 in the high voltage generation part 2 via a wiring body 70 which includes a conductive bar-shaped member 80 (see FIG. 2) having stiffness. The filament 11 is applied with a filament current by the high voltage generation part 2 via the terminals 22, the wiring body 70 and the terminals 23. Besides, the heater 12 is applied with a heater current by the high voltage generation part 2 via the terminals 22, and the terminals 23. In addition, a length of the wiring body 70 corresponds to a distance between the terminals 22 and the terminals 23.

Figure 2:
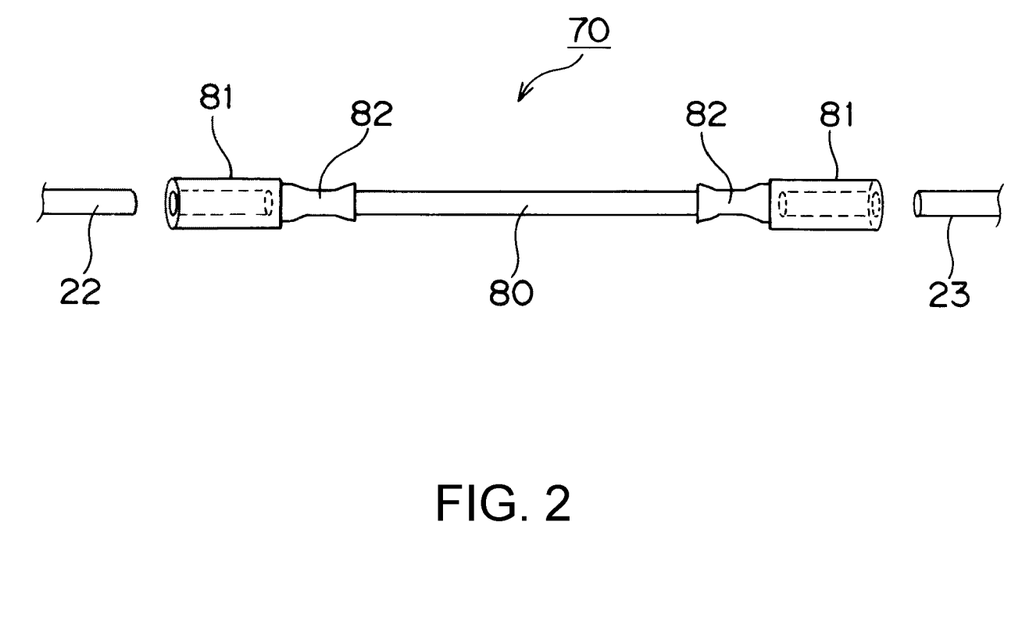
FIG. 2 is an enlarged diagram illustrating a wiring body 70 along with terminals 22, 23.

FIG. 2 is an enlarged diagram illustrating the wiring body 70 along with the terminals 22, 23.

The wiring body 70 includes the conductive bar-shaped member 80 having stiffness, and contact sockets 81 arranged at two ends of the bar-shaped member 80. The socket 81 is fixed to the bar-shaped member 80 using a riveting part 82. Each socket 81 is electrically connected to the terminal 22 and the terminal 23 which function as a contact plug respectively. Therefore, the internal diameter of a recess formed on each socket 81 is consistent with the external diameter of the terminal 22 and the terminal 23.

As for the conductive bar-shaped member 80, for example, among metallic members, a Kovar alloy which blends nickel and cobalt in iron can be used. The weight percent at the moment is, for example, 53% of iron, 29% of nickel and 17% of cobalt. By using such a Kovar alloy as the bar-shaped member 80, the coefficient of thermal expansion of the bar-shaped member 80 can be reduced.

When assembling the X-ray generation device shown in FIG. 1, the socket 81 in the wiring body 70 shown in FIG. 2 is engaged with each terminal 23 in the X-ray tube 1 fixed inside the housing 3. Next, dispose the high voltage generation part 2 in the housing 3, engage each terminal 22 with the socket 81 in the wiring body 70, and then fix the high voltage generation part 2 to the housing 3.

As a result, the soldering operation which is necessary in prior art is no longer needed, the procedures for the assembling of the device can be reduced, and the problem that the bump of the solder becomes a starting point for discharge can be prevented. Besides, because each wiring body 70 has stiffness, even in a case when holding members and so on are not used, contact between each wiring body 70 can be prevented. Furthermore, because each wiring body 70 has stiffness, the socket 81 at the end of each wiring body 70 can be prevented from separating from the terminal 22 or the terminal 23.

In addition, in the first embodiment, on the high voltage generation part 2 side of the glass tube 15, single filament 11 and the heater 12 are arranged; however, there may also be a plurality of filaments 11. Besides, the heater 12 may also be without the filament 11. Furthermore, the terminals 21 in the high voltage generation part 2 may also be connected to the target 13 via a conductive bar-shaped member which is similar to the wiring body 70 and has stiffness. These aspects are also true with other embodiments described below.

Figure 3:
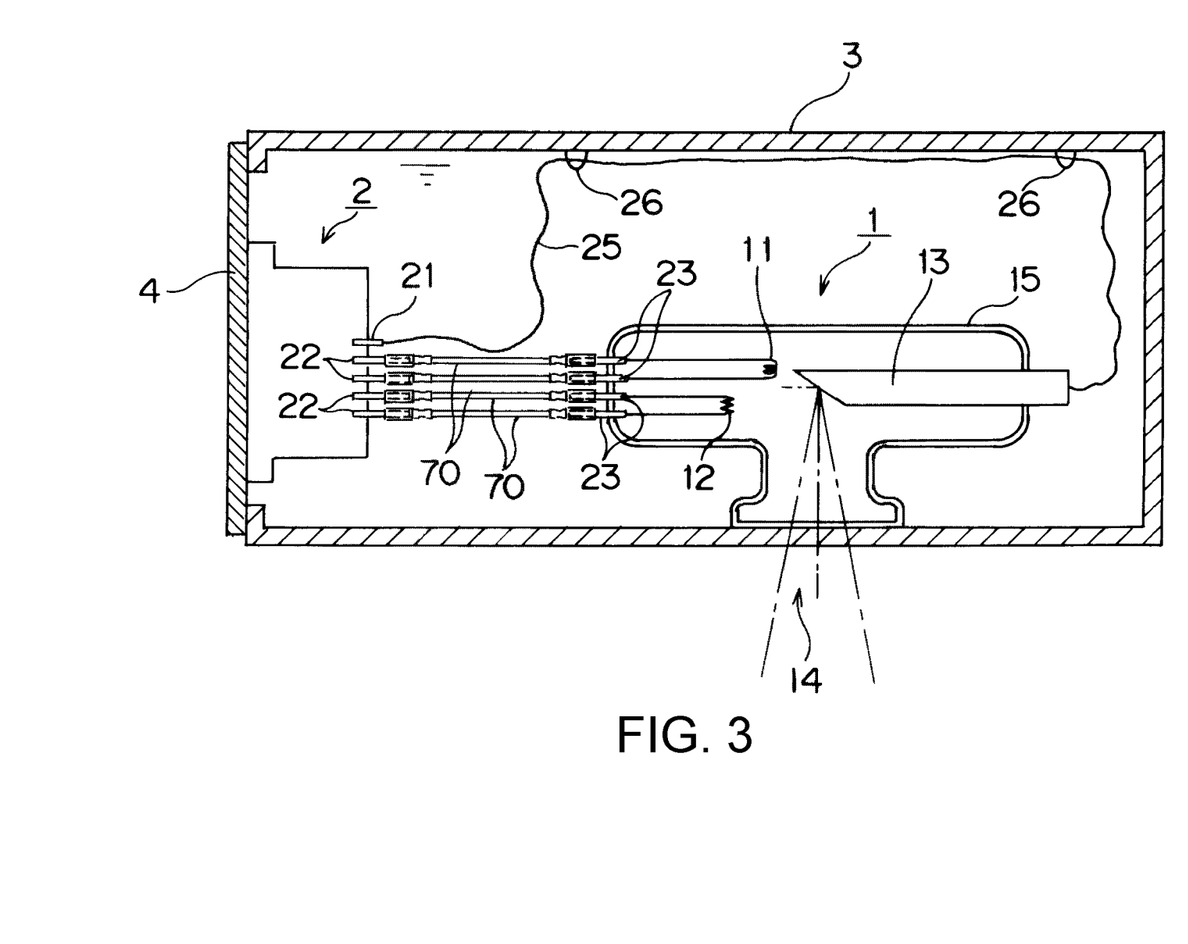
FIG. 3 is a schematic diagram of an X-ray generation device according to a second embodiment of the present disclosure.

Next, another embodiment of the present disclosure is described. FIG. 3 is a schematic diagram of an X-ray generation device according to a second embodiment of the present disclosure. In addition, the members similar to those in the first embodiment are denoted with the same symbols and detailed description is omitted.

The X-ray generation device of the second embodiment has a structure that the high voltage generation part 2 is fixed to the lid body 4 which forms the chamber along with the housing 3. In a case that such a structure is employed, when the lid body 4 is fixed to the housing 3, each terminal 22 in the high voltage generation part 2 can be engaged with the socket 81 in the wiring body 70.

Figure 4:
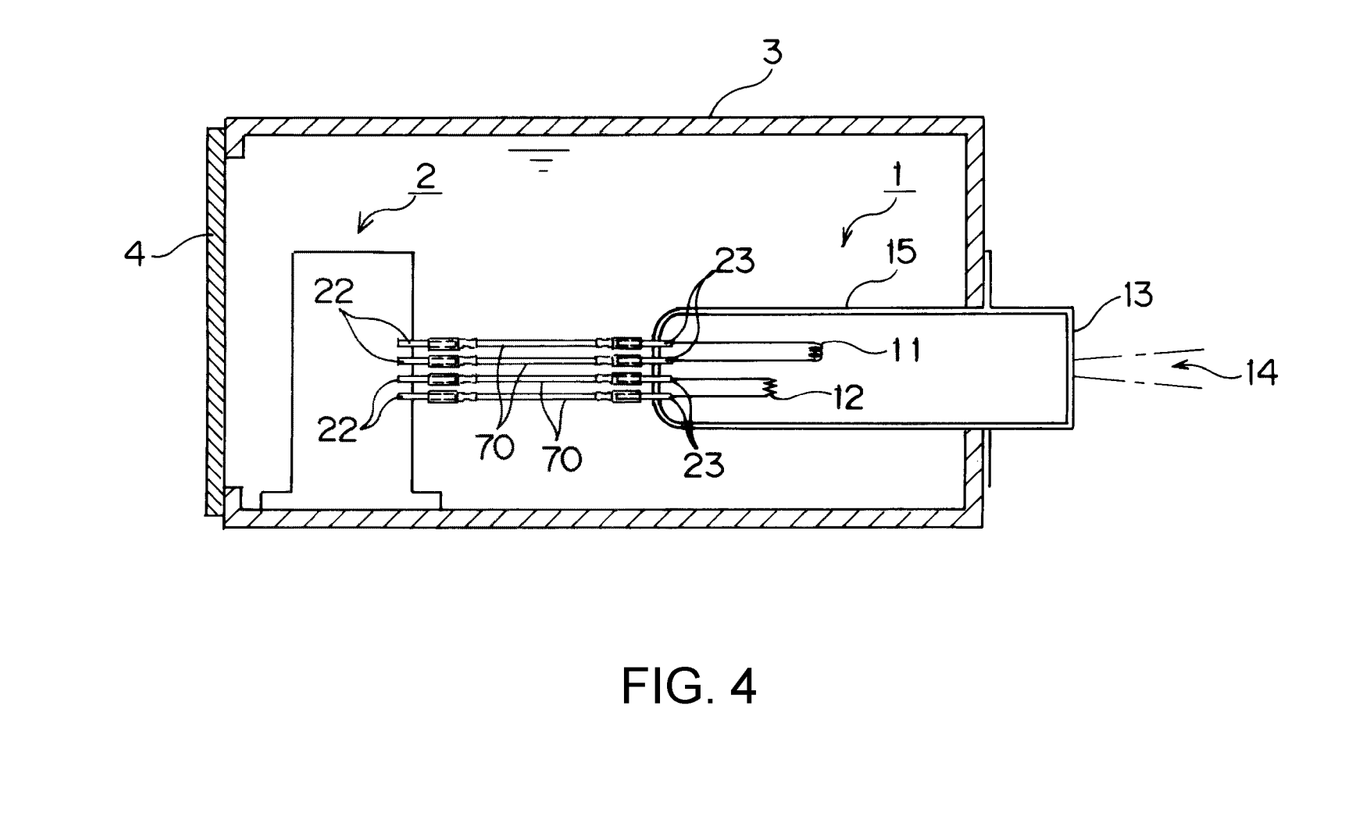
FIG. 4 is a schematic diagram of an X-ray generation device according to a third embodiment of the present disclosure.

Next, still another embodiment of the present disclosure is described. FIG. 4 is a schematic diagram of an X-ray generation device according to a third embodiment of the present disclosure. In addition, the members similar to those in the first and second embodiment are denoted with the same symbols and detailed description is omitted.

In the X-ray generation device of the third embodiment, the X-ray tube 1 includes the terminals 23 arranged in the chamber formed by the housing 3 and the lid body 4, and the target 13 protruding outside from the chamber; and the target 13 is connected to ground via the housing 3. Moreover, the terminals 22 in the high voltage generation part 2 supply a minus voltage to the terminals 23 in the X-ray tube 1 via the wiring body 70. Therefore, in the X-ray generation device of the third embodiment, a wiring for applying a target voltage to the X-ray tube 1 can be omitted.

Figure 5:
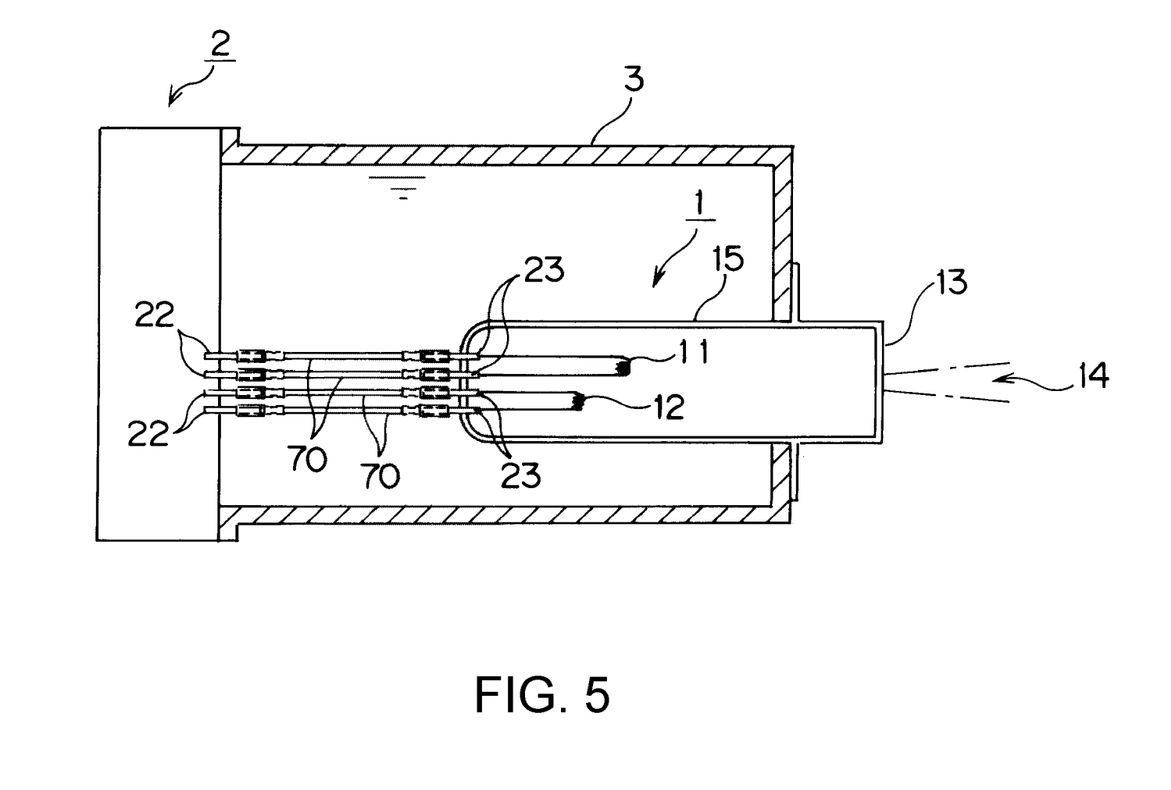
FIG. 5 is a schematic diagram of an X-ray generation device according to a fourth embodiment of the present disclosure.

Next, still another embodiment of the present disclosure is described. FIG. 5 is a schematic diagram of an X-ray generation device according to a fourth embodiment of the present disclosure. In addition, the members similar to those in the third embodiment are denoted with the same symbols and detailed description is omitted.

In the X-ray generation device of the fourth embodiment, similar to the X-ray generation device of the third embodiment, the X-ray tube 1 includes the terminals 23 arranged in the chamber formed by the housing 3 and the lid body 4, and the target 13 protruding outside from the chamber; and the target 13 is connected to ground via the housing 3. Moreover, the terminals 22 in the high voltage generation part 2 supply a minus voltage to the terminals 23 in the X-ray tube 1 via the wiring body 70. Besides, in the X-ray generation device of the fourth embodiment, the high voltage generation part 2 has a lid body structure which closes the housing 3 forming the chamber.

In the X-ray generation device of the fourth embodiment, similar to the X-ray generation device of the third embodiment, a wiring for applying a target voltage to the X-ray tube 1 can be omitted. Besides, by the high voltage generation part 2 doubling as a lid body, the device structure can be simplified.

Figure 6:
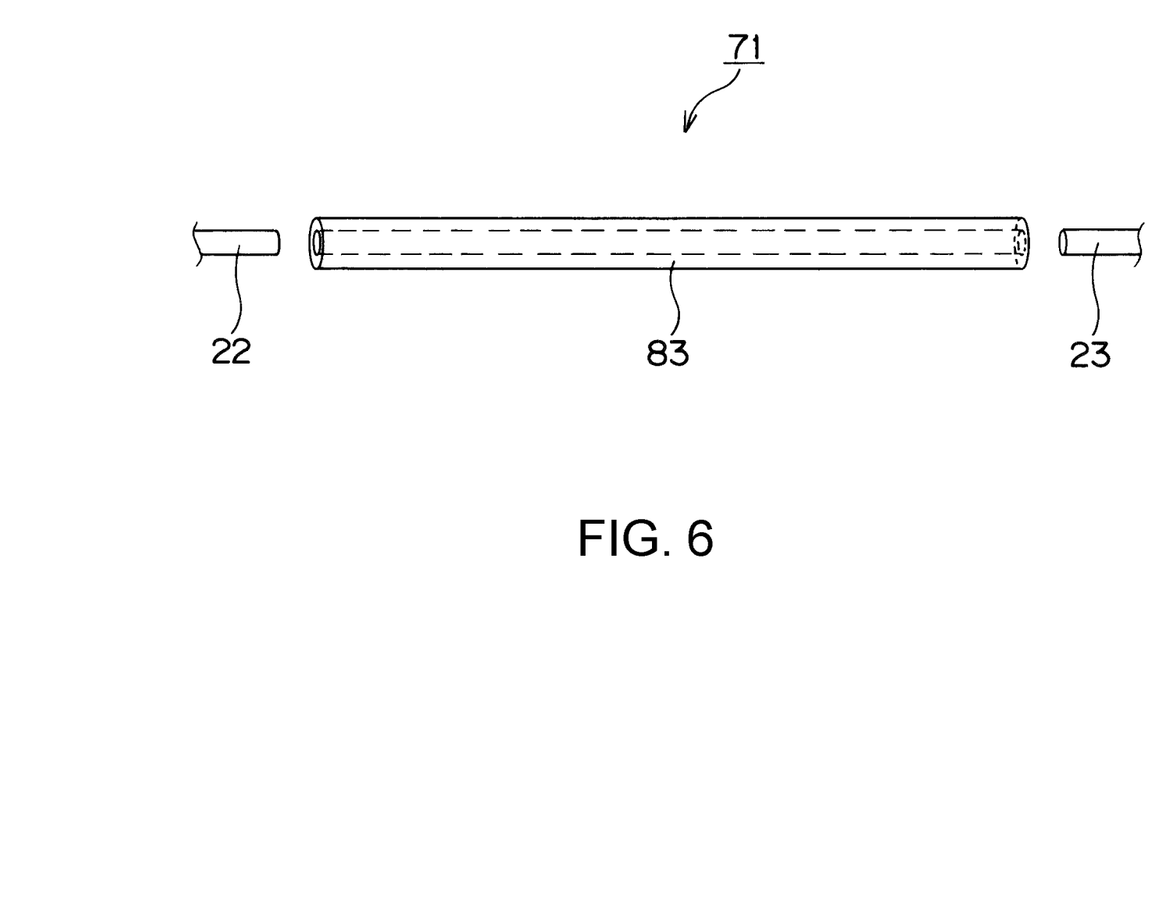
FIG. 6 is an enlarged diagram illustrating a wiring body 71 of the second embodiment along with the terminals 22, 23.

Next, another embodiment of the wiring body used in the X-ray generation device of the present disclosure is described. FIG. 6 is an enlarged diagram illustrating a wiring body 71 of a second embodiment along with the terminals 22, 23.

The wiring body 70 shown in FIG. 2 includes the conductive bar-shaped member 80 having stiffness and the contact sockets 81 arranged at two ends of the bar-shaped member 80. In contrast, the wiring body 71 of the second embodiment is formed by a conductive tubular member 83 having stiffness. The tubular member 83 is formed by the same Kovar alloy as the bar-shaped member 80 in the wiring body 70 shown in FIG. 2. Besides, the internal diameter of the tubular member 83 is consistent with the external diameter of the terminal 22 and the terminal 23.

According to the wiring body 71 of the second embodiment, the terminals 22 in the high voltage generation part 2 and the terminals 23 in the X-ray tube 1 can be electrically connected by an extremely simple structure without using the socket 81.

Figure 7:
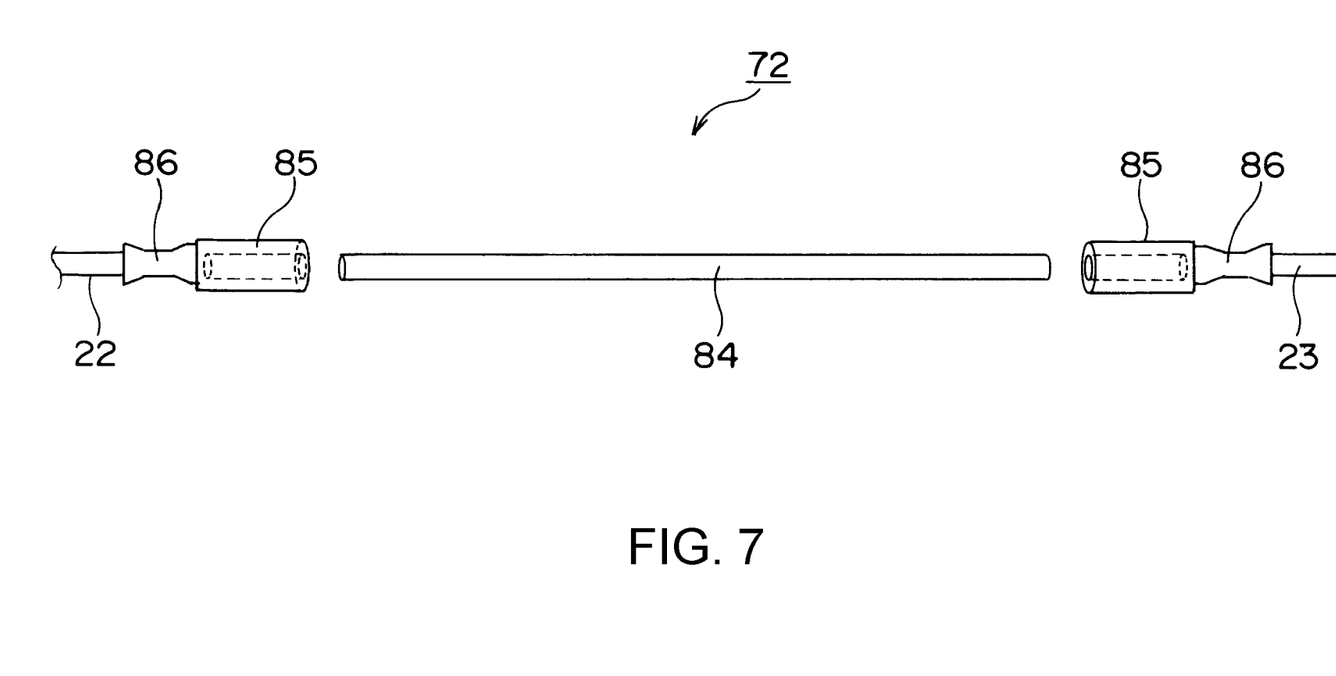
FIG. 7 is an enlarged diagram illustrating a wiring body 72 of the third embodiment along with the terminals 22, 23.

Next, still another embodiment of the wiring body used in the X-ray generation device of the present disclosure is described. FIG. 7 is an enlarged diagram illustrating a wiring body 72 of a third embodiment along with the terminals 22, 23.

The wiring body 72 is formed by a conductive bar-shaped member 84 having stiffness. The bar-shaped member 84 is formed by the same Kovar alloy as the bar-shaped member 80 in the wiring body 70 shown in FIG. 2. Besides, when the wiring body 72 is used, contact sockets 85 are fixed to the terminals 22 in the high voltage generation part 2 and the terminals 23 in the X-ray tube 1 using riveting parts 86. Each socket 85 is electrically connected to the end of the bar-shaped member 84 which functions as a contact plug. Therefore, the internal diameter of a recess formed on each socket 85 is consistent with the external diameter of the bar-shaped member 84.

Figure 8:
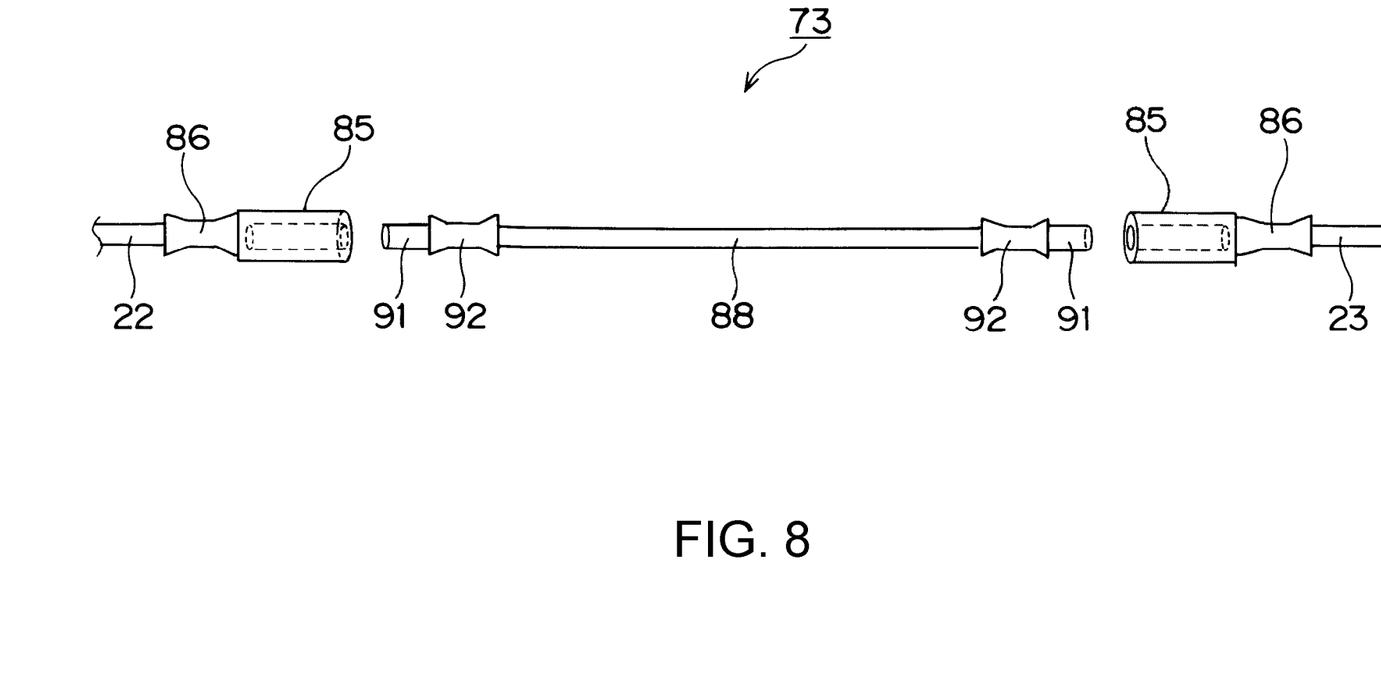

Next, still another embodiment of the wiring body used in the X-ray generation device of the present disclosure is described. FIG. 8 is an enlarged diagram illustrating a wiring body 73 of a fourth embodiment along with the terminals 22, 23 and so on.

The wiring body 73 includes a conductive bar-shaped member 88 having stiffness, and contact plugs 91 arranged at two ends of the bar-shaped member 88. The bar-shaped member 88 is formed by the same Kovar alloy as the bar-shaped member 80 in the wiring body 70 shown in FIG. 2. The plugs 91 are fixed to the bar-shaped member 88 using riveting parts 92. On the other hand, the contact sockets 85 are fixed to the terminals 22 in the high voltage generation part 2 and the terminals 23 in the X-ray tube 1 using riveting parts 86. Each socket 85 is electrically connected to the plug 91 fixed at the two ends of the bar-shaped member 88. Therefore, the internal diameter of a recess formed on each socket 85 is consistent with the external diameter of each plug 91. However, the external diameters of a pair of plugs 91 may be different on the left and right of the bar-shaped member 88.

Figure 9:
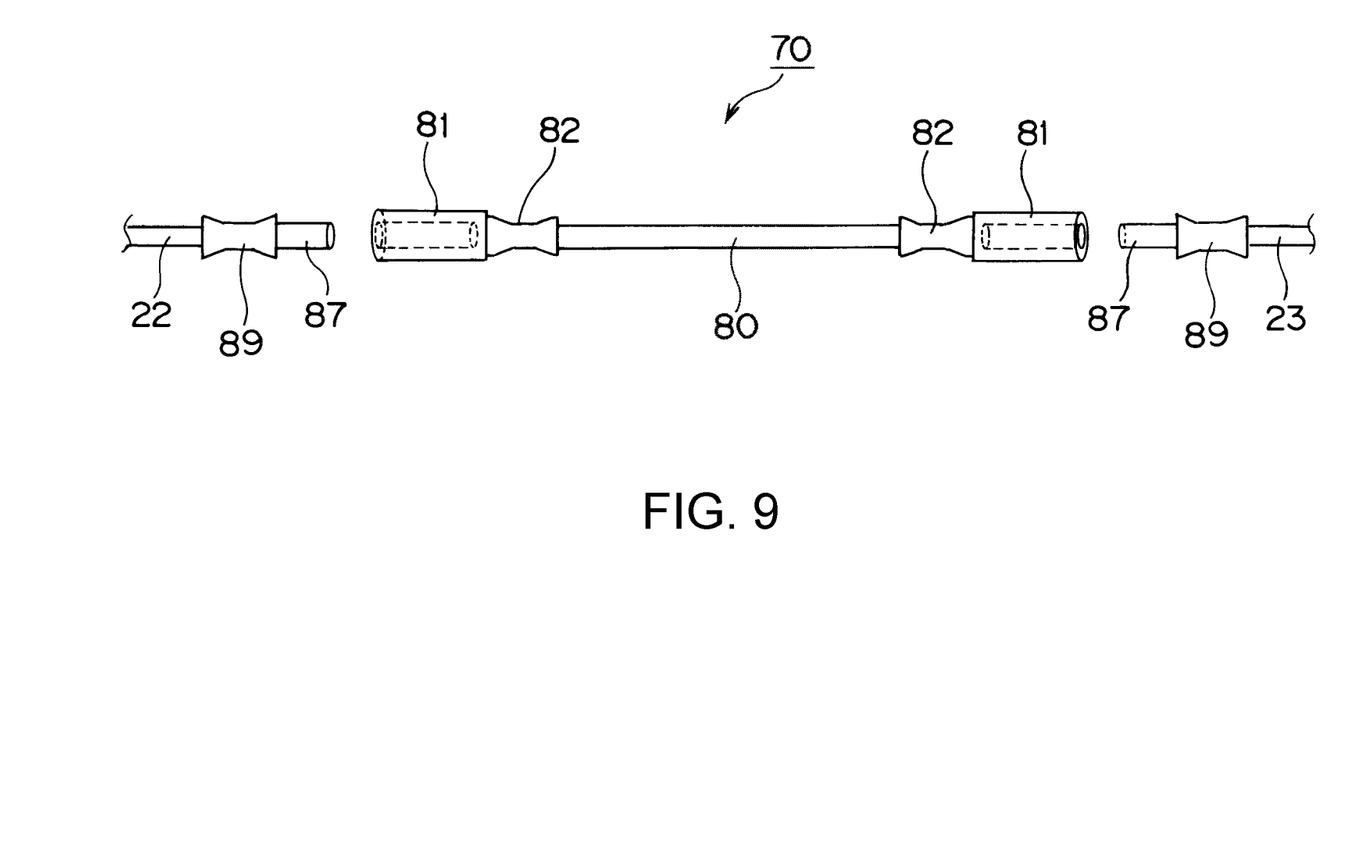

In addition, the socket 85 and the plug 91 in the fourth embodiment shown in FIG. 8 may be disposed conversely. FIG. 9 is an enlarged diagram illustrating the wiring body 70 in such an embodiment along with the terminals 22, 23 and so on.

In the embodiment, the wiring body 70 has a structure which is the same as the first embodiment shown in FIG. 2. On the other hand, contact plugs 87 are fixed to the terminals 22 in the high voltage generation part 2 and the terminals 23 in the X-ray tube 1 using riveting parts 89. Each plug 87 is electrically connected to the socket 81 fixed at the two ends of the bar-shaped member 80. Therefore, the internal diameter of a recess formed on each socket 81 is consistent with the external diameter of each plug 87. However, the external diameter of a pair of plugs 87 may be different on the left and right of the bar-shaped member 80.

In the embodiments shown in FIG. 8 and FIG. 9, the structure is employed in which contact plugs or sockets are attached to the bar-shaped member 80, 88, and the terminals 22 in the high voltage generation part 2 or the terminals 23 in the X-ray tube 1. By employing such a structure, the electrical connection by the contact can be more reliable. In such a case, not only can simple cylindrical socket be used, but various sockets capable of implementing electrical connection more reliably can also be used.

In the case described in the abovementioned embodiment, the plurality of wiring bodies 70, 71, 72, 73 used in the X-ray generation device of the present disclosure have the same length; however, by changing the distance between the terminals 22 in the high voltage generation part 2 and the terminals 23 in the X-ray tube 1, wiring bodies with lengths different from each other may be used as the plurality of wiring bodies 70, 71, 72, 73.

Moreover, the X-ray generation device of the present disclosure having the abovementioned structure can be applied to an X-ray fluoroscopic photographing device or CT photographing device. Accordingly, an X-ray fluoroscopic image or a CT image can be preferably photographed.

What is claimed is:

1. An X-ray generation device, comprising: an X-ray tube; a high voltage generation part, which applies a high voltage to the X-ray tube; and a plurality of wiring bodies, each of which connects a terminal in the X-ray tube to a terminal in the high voltage generation part; wherein
    a portion of or a whole of the each of the wiring bodies is formed by a conductive bar-shaped member having stiffness, which comprises a connecting part that is connected to the terminal in the X-ray tube at one end, and includes a connecting part that is connected to the terminal in the high voltage generation part at the other end, and
    the each of the wiring bodies connects the terminal in the X-ray tube and the terminal in the high voltage generation part by mechanical engaging.

2. The X-ray generation device according to claim 1, wherein
    a metallic bar-shaped member is used as the conductive bar-shaped member.

3. The X-ray generation device according to claim 1, wherein
    a contact socket is arranged at each of both end portions of the conductive bar-shaped member.

4. The X-ray generation device according to claim 1, wherein
    a contact socket is arranged at each of both end portions of the conductive bar-shaped member, and a contact plug is arranged on the terminal in the X-ray tube or the terminal in the high voltage generation part.

5. The X-ray generation device according to claim 1, wherein
    a contact plug is arranged on each of both end portions of the conductive bar-shaped member, and a contact socket is arranged on the terminal in the X-ray tube or the terminal in the high voltage generation part.

6. The X-ray generation device according to claim 1, wherein
    the conductive bar-shaped member is a tubular member capable of being connected to the terminal in the X-ray tube and the terminal of the high voltage generation part.

7. The X-ray generation device according to claim 1, wherein
    the terminal in the X-ray tube and the terminal in the high voltage generation part are accommodated in a chamber, and an interior of the chamber is filled with insulating oil.

8. The X-ray generation device according to of claim 7, wherein
    the X-ray tube comprises a terminal arranged in the chamber and a target protruding outside from the chamber, the target is connected to ground, the high voltage generation part has a lid body structure closing the chamber, and the terminal in the high voltage generation part supply a minus voltage to the terminal in the X-ray tube.

9. The X-ray generation device according to claim 1, wherein
    the terminal in the X-ray tube and the terminal in the high voltage generation part are accommodated in a chamber, and an interior of the chamber is filled with an insulating gas.

10. The X-ray generation device according to claim 1, wherein
    the terminal in the X-ray tube and the terminal in the high voltage generation part are accommodated in a chamber, and an interior of the chamber is set to a high-vacuum state.

11. An X-ray fluoroscopic image photographing device, which uses the X-ray generation device according to claim 1.

12. A Computed Tomography image photographing device, which uses the X-ray generation device according to claim 1.

* * * * *